United States Patent
Sasage et al.

(10) Patent No.: US 7,151,173 B2
(45) Date of Patent: Dec. 19, 2006

(54) ADMIXTURE, EXTRUDABLE HYDRAULIC COMPOSITION AND METHOD FOR THE SELECTION OF ADMIXTURE

(75) Inventors: Yoshiaki Sasage, Niigata-ken (JP); Tsutomu Yamakawa, Niigata-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 110 days.

(21) Appl. No.: 10/391,008

(22) Filed: Mar. 19, 2003

(65) Prior Publication Data

US 2003/0177956 A1 Sep. 25, 2003

(30) Foreign Application Priority Data

Mar. 19, 2002 (JP) ......................... 2002-076058

(51) Int. Cl.
*C04B 16/02* (2006.01)

(52) U.S. Cl. .................. 536/124; 536/30; 536/43; 536/76; 536/85; 536/87; 536/88; 536/91; 536/58; 106/638; 106/163.01; 106/692; 106/713; 106/729; 106/172.1; 106/724; 106/805; 424/468; 430/617; 524/5

(58) Field of Classification Search ............ 536/124, 536/30, 43, 76, 85, 87, 88, 91, 58; 106/638, 106/163.01, 692, 713, 729, 172.1, 724, 805; 424/468; 430/617; 524/5; 526/200; 162/68
See application file for complete search history.

(56) References Cited

U.S. PATENT DOCUMENTS 6,755,908 B1 * 6/2004 Sasage et al. ............... 106/805
6,811,605 B1 * 11/2004 Sasage et al. ............... 106/805

FOREIGN PATENT DOCUMENTS

| JP | 58-132505 A | 8/1983 |
| JP | 1-141855 A | 6/1989 |
| JP | 1141855 * | 6/1989 |
| JP | 10017348 * | 1/1998 |

* cited by examiner

*Primary Examiner*—James O. Wilson
*Assistant Examiner*—Devesh Khare
(74) *Attorney, Agent, or Firm*—Birch, Stewart, Kolasch & Birch, LLP

(57) ABSTRACT

A nonionic water-soluble cellulose ether is characterized in that when 3 pbw of the nonionic water-soluble cellulose ether is added to a mixture of 90 pbw of cordierite, 10 pbw of ordinary Portland cement, and 33 pbw of water, immediately followed by kneading at 20° C. and 20 rpm, a maximum torque for kneading is reached within 180 seconds from the addition. It is suitable as an admixture for extrudable hydraulic compositions. The hydraulic composition to which the inventive admixture is added can be kneaded within a brief time into a uniform mass which is smoothly extrudable.

5 Claims, 1 Drawing Sheet

ADMIXTURE, EXTRUDABLE HYDRAULIC COMPOSITION AND METHOD FOR THE SELECTION OF ADMIXTURE

TECHNICAL FIELD

This invention relates to an admixture which enables an extrudable hydraulic composition to be kneaded into a uniform mass within a short time, an extrudable hydraulic composition comprising the same, and a method for selecting a nonionic water-soluble cellulose ether suitable as the admixture.

BACKGROUND OF THE INVENTION

In traditional hydraulic compositions for extrusion molding, asbestos were used as additive fibers for facilitating extrusion into hardened parts having surface smoothness. In the recent years, the amount of asbestos used drastically decreased due to health considerations and legal regulations. At present, pulp fibers are often used as the substitute. In unison with this tendency, nonionic water-soluble cellulose ether is commonly used for the purposes of improving the dispersion of pulp fibers, enhancing strength properties and facilitating extrusion.

As the avoidance of asbestos is in progress, the amount of nonionic water-soluble cellulose ether used is increasing. This increases the cost of extruded parts, preventing widespread use thereof.

Extrudability depends on the solubility of a nonionic water-soluble cellulose ether used. On use of a nonionic water-soluble cellulose ether having a slow dissolution rate, a longer time of kneading is needed or the amount of the cellulose ether must be increased. These drawbacks also increase the cost of extruded parts, preventing widespread use thereof.

SUMMARY OF THE INVENTION

An object of the present invention is to provide an admixture comprising a nonionic water-soluble cellulose ether, which permits an extrudable hydraulic composition to be obtained by brief kneading of necessary components with a reduced amount of the nonionic water-soluble cellulose ether and hence, at a low cost, the composition being effectively extrudable into hardened parts of quality. Another object is to provide an extrudable hydraulic composition comprising the admixture. A further object is to provide a method for selecting a nonionic water-soluble cellulose ether suitable for use as the admixture.

The inventor has found that a nonionic water-soluble cellulose ether which is characterized in that a maximum torque (or torque peak) for kneading at 20° C. and 20 rpm immediately after addition of the nonionic water-soluble cellulose ether to a mixture of cordierite, ordinary Portland cement, and water is reached within 180 seconds from the addition is effective as an admixture; that an extrudable hydraulic composition to which the admixture is added can be finished by brief kneading of necessary components, even with a reduced amount of the nonionic water-soluble cellulose ether; and that this hydraulic composition can be uniformly and smoothly extruded into hardened parts with a satisfactory outer appearance.

The inventor made a study on the nonionic water-soluble cellulose ether which when added as an admixture to a hydraulic composition for extrusion, can render the composition effectively extrudable and impart surface smoothness to extruded parts thereof. One common method of evaluating extrudability and extrudate properties involves mixing a ceramic, typically cordierite with a small amount of ordinary Portland cement and water, adding a conventional amount of a cellulose ether thereto, kneading the mixture, extruding the mixture, and examining the ease of extrusion and the state of extruded parts. More particularly, 100 parts by weight of a blend of 90 parts by weight of cordierite and 10 parts by weight of ordinary Portland cement is mixed with 33 parts by weight of water, and 3 parts by weight of a cellulose ether is added to the mixture. Immediately thereafter, the ingredients are kneaded at 20° C. and 20 rpm while a torque needed for kneading is measured. The cellulose ether is evaluated to help kneading complete within a short time when the time taken until a maximum torque or torque peak is reached is fully short, typically within 180 seconds, from immediately after the addition of cellulose ether. When a hydraulic composition is kneaded and extruded using such a nonionic water-soluble cellulose ether which enables brief kneading, extrusion can be carried out without failures such as meander and breakage, and extruded parts having improved surface smoothness are available. The present invention is predicated on this finding.

Accordingly, the present invention in one aspect provides an admixture for extrudable hydraulic compositions, comprising a nonionic water-soluble cellulose ether which is characterized in that when 3 parts by weight of the nonionic water-soluble cellulose ether is added to a mixture of 90 parts by weight of cordierite, 10 parts by weight of ordinary Portland cement, and 33 parts by weight of water, and the ingredients are kneaded at 20° C. and 20 rpm immediately thereafter, a maximum torque for kneading is reached within 180 seconds from the addition.

An extrudable hydraulic composition comprising the admixture is also provided.

In a further aspect, the present invention provides a method for selecting a nonionic water-soluble cellulose ether suitable for use as an admixture for extrudable hydraulic compositions, comprising the steps of adding 3 parts by weight of a nonionic water-soluble cellulose ether to a mixture of 90 parts by weight of cordierite, 10 parts by weight of ordinary Portland cement, and 33 parts by weight of water; immediately thereafter kneading the ingredients at 20° C. and 20 rpm; measuring a time taken until a maximum torque for kneading is reached; and judging the nonionic water-soluble cellulose ether to be suitable when the time taken until a maximum torque is reached is within 180 seconds from the addition.

DETAILED DESCRIPTION OF THE INVENTION

Figure 1:
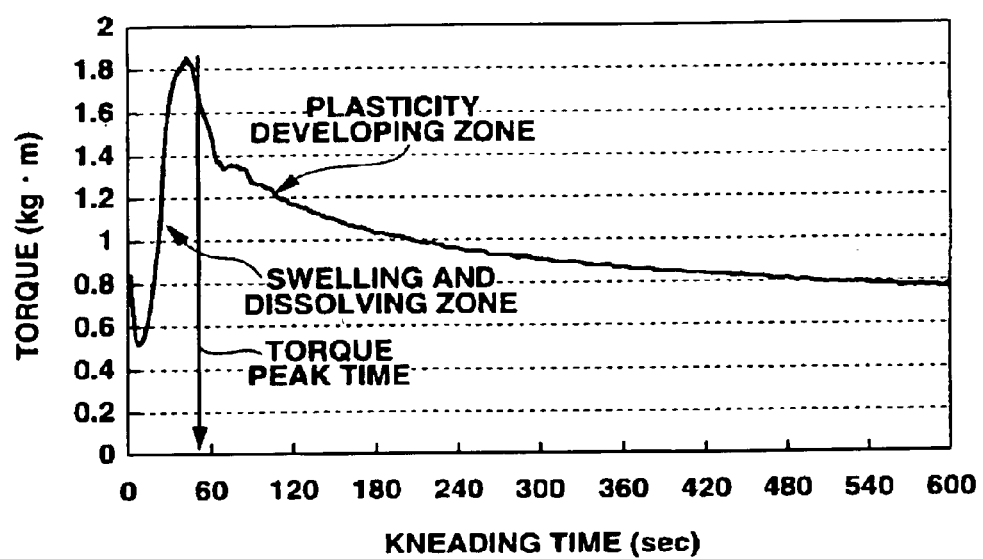
FIG. 1 is a diagram showing how the kneading torque changes as a nonionic water-soluble cellulose ether is dissolved.

The admixture of the invention for extrudable hydraulic compositions is defined as comprising a nonionic water-soluble cellulose ether.

The nonionic water-soluble cellulose ethers which can be used herein include alkyl celluloses, hydroxyalkyl celluloses, and hydroxyalkyl alkyl celluloses. Illustrative examples include, but are not limited to, methyl cellulose, ethyl cellulose, hydroxyethyl cellulose, hydroxypropyl cellulose, hydroxyethyl methyl cellulose, hydroxyethyl ethyl cellulose and hydroxypropyl methyl cellulose.

Among these, an appropriate nonionic water-soluble cellulose ether is selected which is characterized in that when 3 parts by weight of the nonionic water-soluble cellulose ether is added to a mixture of 90 parts by weight of cordierite, 10 parts by weight of ordinary Portland cement, and 33 parts by weight of water, immediately followed by kneading at 20° C. and 20 rpm, a maximum torque or torque peak for kneading is reached within 180 seconds from immediately after the addition. When an admixture comprising an appropriate nonionic water-soluble cellulose ether is used in a hydraulic composition, it becomes possible to complete kneading of the hydraulic composition within a short time, even with a reduced amount of nonionic water-soluble cellulose ether, to provide a uniform hydraulic composition amendable to extrusion. The time taken until a maximum torque or torque peak is reached is preferably within 120 seconds, and more preferably within 60 seconds. If the time taken until a maximum torque is reached exceeds 180 seconds, the kneading time must be markedly extended due to substantially retarded dissolution, which is inconvenient for practical manufacture.

The time taken until a maximum torque or torque peak is reached is defined below. An experiment is carried out by using Labo Plastomill Model 30C150 (Toyo Seiki Seisakusho, Ltd.) equipped with a mixer having an internal volume of 60 cm$^3$ and a sigma shape blade S90B, feeding a sample to the mixer, adjusting the temperature of the mixer and the sample at 20° C., kneading the sample at 20 rpm, and measuring a time passed until a torque peak is reached. The sample used was prepared by previously thoroughly mixing 63 g of ready-mixed cordierite AF-2 (Marusu Yuyaku Goshi Kaisha) and 7 g of ordinary Portland cement, adding 23.1 g of water thereto, thoroughly mixing and granulating the mixture, and adding 2.1 g of a nonionic water-soluble cellulose ether thereto. The thus prepared sample is kneaded in the mixer under the above-described conditions immediately after the addition of nonionic water-soluble cellulose ether. From a profile of kneading torque change, a peak time is determined. A zone of the profile where the torque rises corresponds to the duration when the nonionic water-soluble cellulose ether is being swollen and dissolved while absorbing water, and a torque peak develops as a peak of partial dissolution. As dissolution proceeds further, plasticity is imparted to the kneaded mass and accordingly, the kneading torque decreases again. FIG. 1 is a diagram showing a profile of kneading torque measured for the cellulose ether used in Example 2.

Preferably, the nonionic water-soluble cellulose ether has an aerated bulk density of 0.2 to 0.65 g/cm$^3$, more preferably 0.2 to 0.4 g/cm$^3$. Also preferably, the nonionic water-soluble cellulose ether has a viscosity of 1,000 to 50,000 mPa·s, more preferably 1,500 to 50,000 mPa·s, most preferably 3,000 to 50,000 mPa·s, as measured in a 1 wt % aqueous solution at 20° C. by a Brookfield viscometer at 12 rpm.

The nonionic water-soluble cellulose ether used herein is obtainable by properly selecting the type, substitution degree, bulk density, viscosity, average particle size, particle size distribution and other parameters of cellulose ether.

On use, the admixture of the invention comprising the nonionic water-soluble cellulose ether, especially consisting of the nonionic water-soluble cellulose ether alone or as a mixture of two or more is added to an extrudable hydraulic composition. The amount of the admixture added (the total amount of nonionic water-soluble cellulose ethers) is an amount necessary to permit the hydraulic composition to be extruded, usually 0.1 to 2.0% by weight based on the entire components of the extrudable hydraulic composition excluding water, preferably 0.2 to 2.0% by weight and more preferably 0.2 to 1.5% by weight.

If necessary, another water-soluble polymer may be used along with the admixture of the invention for extrudable hydraulic compositions. Examples of other water-soluble polymers include partially saponified polyvinyl alcohol, modified starch, polyethylene oxide, wellan gum, and polyacrylamide.

The extrudable hydraulic composition of the invention contains the admixture defined above as well as conventional components such as hydraulic substances, aggregates, lightweight aggregates, and reinforcing fibers.

The hydraulic substances that harden in the presence of water include cement and gypsum. Cements include ordinary Portland cement, early-strength cement, blast furnace slag cement, fly-ash cement and alumina cement. Gypsum-based hydraulic substances include primarily the dehydrate, hemihydrate and anhydride forms of gypsum. The content of cement or gypsum-based hydraulic substances is not critical and may be set as needed to achieve the required strength.

Powdered silica and fly ash are typical aggregates. Besides, lightweight aggregates are used when weight reduction is desired, and include perlite, hollow microspheres, and styrene beads. Whether the aggregate is ordinary or lightweight, it is combined with the hydraulic substance so that the desired properties are achievable. The hydraulic substance and the aggregate are used in a weight ratio of from 10:90 to 100:0.

Reinforcing fibers are also useful in the hydraulic compositions. At present, pulp fibers that eliminate a concern about carcinogenicity become a substitute for asbestos and are widely used. In the practice of the invention, pulp fibers are advantageously used. Pulp fibers include fibers of virgin pulp, recycled paper pulp, and pulps originating from conifer and broadleaf woods, having an average length of about 200 to 2,000 μm. Polypropylene, vinylon and acrylic fibers are also useful. From the fire resistance and other standpoints, fibers are preferably used in amounts of 1 to 10 parts by weight provided that the total of the entire components of the hydraulic composition excluding water is 100 parts by weight.

If necessary, setting accelerators and retarders, and surface active agents such as water-reducing agents and dispersing agents are used. These agents are effective for managing the physical properties of a fresh hydraulic composition immediately after mixing of components with water. Any agent meeting a particular purpose may be added in a conventional amount.

To the hydraulic composition of the invention, water is added. The amount of water is conventional though it is determined in accordance with the type of hydraulic composition or the like. Water is preferably used in amounts of 20 to 80 parts by weight provided that the total of the entire components of the hydraulic composition excluding water is 100 parts by weight.

The hydraulic composition of the invention is obtainable by mixing and kneading the aforementioned components in a conventional manner. The hydraulic composition thus obtained is formed and hardened into a hardened body by an extrusion molding or suitable method.

EXAMPLES

Examples of the invention and comparative examples are provided to illustrate the invention, and are not intended to limit the scope thereof.

Examples 1–3 and Comparative Example 1

Extrudable cement-based compositions formulated as shown in Table 2 below were prepared from the following materials.

(1) Cement: ordinary Portland cement
(2) Silica: sifted silica powder
(3) Pulp: virgin pulp having an average fiber length of 0.8 mm
(4) Perlite: average particle size 0.8 mm
(5) Water-soluble cellulose ether: Four samples of methyl cellulose were furnished. The time of torque peak upon dissolution in Labo Plastomill and viscosity of these samples are shown in Table 1. The torque peak time was measured by the procedure described above.

TABLE 1

Torque peak time and viscosity of water-soluble cellulose ether

| Sample No. | Torque peak time (sec) | Viscosity of 1 wt % aqueous solution (mPa · s) |
|---|---|---|
| 1 | 20 | 2,000 |
| 2 | 54 | 12,800 |
| 3 | 171 | 5,400 |
| 4 | 205 | 7,200 |

The above materials other than water were mixed for 3 minutes in a Henschel mixer, and the prescribed amount of water was added. Immediately thereafter, the mixture was worked 4 minutes in a 10-liter kneader-extruder, then extruded in vacuum. The parts extruded through a die of 6×75 mm profile were examined for extrudability and surface smoothness. The test results are shown in Table 2.

The evaluation criteria of these tests are shown below.
Extrudability: Visually Observed
  ◯: no meander nor breakage
  X: meander or breakage
Surface Smoothness: Visual Observation and Hand Feel
  ◯: no apparent asperities, not rough to the feel
  Δ: few apparent asperities, but rough to the feel
  X: apparent asperities

TABLE 2

| Materials (pbw) | Example 1 | Example 2 | Example 3 | Comparative Example 1 |
|---|---|---|---|---|
| Cement | 45 | 45 | 45 | 45 |
| Silica powder | 30 | 30 | 30 | 30 |
| Pulp | 5 | 5 | 5 | 5 |
| Perlite | 20 | 20 | 20 | 20 |
| Cellulose ether | No. 1 | No. 2 | No. 3 | No. 4 |
| Cellulose ether amount | 1.2 | 1.2 | 1.2 | 1.2 |
| Water | 45 | 45 | 45 | 45 |
| Results | | | | |
| Extrudability | ◯ | ◯ | ◯ | X (broken) |
| Surface smoothness | ◯ | ◯ | ◯ | — |

As is evident from Table 2 the hydraulic compositions of Examples were effectively extrudable into hardened products having improved surface smoothness after the reasonable time of kneading. In contrast, the hydraulic composition of Comparative Example 1 was broken upon extrusion because of insufficient dissolution of the nonionic water-soluble cellulose ether within the reasonable time.

The hydraulic composition to which a suitable amount of the inventive admixture is added can be kneaded within a brief time, obtaining a uniform kneaded mass which is smoothly extrudable.

Japanese Patent Application No. 2002-076058 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An admixture for extrudable hydraulic compositions, comprising a nonionic water-soluble cellulose ether which is characterized in that when 3 parts by weight of the nonionic water-soluble cellulose ether is added to a mixture of 90 parts by weight of cordierite, 10 parts by weight of ordinary Portland cement, and 33 parts by weight of water, thereby producing a test mixture and when the test mixture is immediately kneaded at 20° C. and 20 rpm in a device whose kneading-torque is measured, the maximum kneading-torque is reached within 180 seconds.

2. The admixture of claim 1 wherein the nonionic water-soluble cellulose ether is at least one nonionic water-soluble cellulose ether selected from the group consisting of alkyl cellulose, hydroxyalkyl cellulose and hydroxyalkyl alkyl cellulose.

3. An extrudable hydraulic composition comprising the admixture of claim 1 and a hydraulic substance.

4. An extrudable hydraulic composition comprising:

(A) a nonionic water-soluble cellulose ether which is characterized in that when 3 parts by weight of the nonionic water-soluble cellulose ether is added to a mixture of 90 parts by weight of cordierite, 10 parts by weight of ordinary Portland cement, and 33 parts by weight of water, thereby producing a test mixture and when the test mixture is immediately kneaded at 20° C. and 20 rpm in a device whose kneading-torque is measured, the maximum kneading-torque is reached within 180 seconds;

(B) cordierite; and (C) Portland cement.

5. The extrudable hydraulic composition of claim 3 further comprising an aggregate.

* * * * *